(12) United States Patent
Gross et al.

(10) Patent No.: US 7,661,316 B2
(45) Date of Patent: Feb. 16, 2010

(54) METHOD AND APPARATUS FOR SENSING AND CONTROLLING FAN SPEED

(75) Inventors: Kenny C. Gross, San Diego, CA (US); Aleksey M. Urmanov, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 375 days.

(21) Appl. No.: 11/776,715

(22) Filed: Jul. 12, 2007

(65) Prior Publication Data

US 2009/0015241 A1 Jan. 15, 2009

(51) Int. Cl.
*G01P 3/00* (2006.01)
(52) U.S. Cl. .................. 73/660; 417/2; 417/42
(58) Field of Classification Search ............ 73/660; 415/119; 416/33, 44; 417/2, 42
See application file for complete search history.

(56) References Cited

U.S. PATENT DOCUMENTS

| | | | | |
|---|---|---|---|---|
| 5,789,678 A * | 8/1998 | Pla | ............... | 73/660 |
| 6,298,728 B1 * | 10/2001 | Fekete et al. | ........... | 73/660 |
| 7,282,873 B2 * | 10/2007 | Abali et al. | ........... | 318/41 |
| 7,303,140 B2 * | 12/2007 | Jones et al. | ........... | 236/49.3 |

* cited by examiner

*Primary Examiner*—John E Chapman
(74) *Attorney, Agent, or Firm*—Park, Vaughan & Fleming LLP

(57) ABSTRACT

One embodiment of the present invention provides a system that determines fan speeds for a set of fans in a computer system. During operation, the system receives time-series data collected by a vibration transducer associated with the computer system, wherein the vibration transducer is configured to record mechanical vibrations from the set of fans. Next, the system performs a spectral analysis on the time-series data to obtain frequency peaks associated with fan speeds for individual fans in the set of fans. The system then identifies fan speeds for the individual fans in the set of fans from the frequency peaks.

26 Claims, 4 Drawing Sheets

METHOD AND APPARATUS FOR SENSING AND CONTROLLING FAN SPEED

BACKGROUND

1. Field of the Invention

Embodiments of the present invention relate to techniques for performing reliability testing on computer systems. More specifically, embodiments of the present invention relate to a method and an apparatus for performing high-accuracy fan-speed sensing and control to assure vibrational integrity in a computer system.

2. Related Art

Computer systems such as servers and storage arrays can be adversely affected by mechanical vibrations of system internal components and structures. These vibrational problems are becoming more significant because of the following trends: (1) cooling fans are becoming increasingly more powerful; (2) chassis and support structures are becoming weaker because of design modifications to reduce cost and weight; and (3) internal disk drives, power supplies, and other system components are becoming more sensitive to vibration-induced degradation. For example, hard disk drives (HDDs) are becoming more sensitive to vibration because the storage density for HDDs has increased to the point where a write head has to align with a track which is less than 20 nanometers wide. Moreover, the write head floats only 7 nanometers above the disk surface. These extremely small dimensions make the read and write performance of the HDDs very sensitive to vibrations.

Some servers and storage arrays are equipped with a large number of cooling fans (e.g., twelve or more) that operate at very high speeds. Hence, cooling-fan-induced vibrations are a primary source of mechanical vibration in a computer system. Ideally, all cooling fans in a computer system operate at a constant speed which is determined based on design criteria. In practice, however, fan speeds in computer systems are not actively controlled, and hence the speed of each fan typically varies from the designed speed. As a result, multiple fans inside a computer system can produce a spread of mean fan speeds.

One problem associated with fan speed variation is that it can excite vibrational resonances within a computer system's mechanical structure. Specifically, if a fan's operating speed or an associated harmonic coincides with an internal vibrational resonance of the computer system, there can be a significant resonance-related amplification of the vibration which can cause system components such as disk drives and power supplies to fail. Moreover, when there is a spread in the mean fan speeds for multiple fans operating in parallel, the spread in mean fan speeds can cause a "beat" effect which creates numerous new frequencies. These new frequencies create additional opportunities for their harmonics to intersect with the internal structural resonances. Hence, it is highly desirable to be able to ensure that all fans operate at a desired speed.

Fan speeds can be measured by determining fan shaft rotation using a tachometer. Unfortunately, tachometer measurements of shaft rotations per minute (RPM) generally have a high degree of uncertainty. For example, in some server systems, the standard deviation of fan speeds is on the order of 7%. This measurement uncertainty can even exceed the differences between mean fan speeds in systems with multiple fans, making it extremely difficult to monitor fan speeds and to align them with a desired fan speed. Moreover, because each of the multiple fans is integrated with a dedicated tachometer, all these tachometers continuously produce a large quantity of fan speed data which can consume computational resources.

Hence, what is needed is a method and an apparatus that facilitates measuring and controlling fan speeds with high accuracy.

SUMMARY

One embodiment of the present invention provides a system that determines fan speeds for a set of fans in a computer system. During operation, the system receives time-series data collected by a vibration transducer associated with the computer system, wherein the vibration transducer is configured to record mechanical vibrations from the set of fans. Next, the system performs a spectral analysis on the time-series data to obtain frequency peaks associated with fan speeds for individual fans in the set of fans. The system then identifies fan speeds for the individual fans in the set of fans from the frequency peaks.

In a variation on this embodiment, for each fan in the set of fans, the system identifies the fan speed by: (1) perturbing the speed of the fan by a small amount; (2) observing a shifted peak in the frequency peaks in response to the perturbation; and (3) identifying a corresponding frequency at the shifted peak to be the speed of the fan.

In a further variation on this embodiment, the system perturbs the speed of the fan by: margining up the fan speed for a short period of time; margining down the fan speed for a short period of time; or performing a combination of the above.

In a further variation, the system margins the fan speed by adjusting a control voltage for the fan speed.

In a variation on this embodiment, the vibration transducer is an accelerometer.

In a further variation on this embodiment, the accelerometer can include a dedicated accelerometer or an embedded accelerometer in a hard disk drive of the computer system.

In a variation on this embodiment, the system aligns the identified fan speeds with a target fan speed.

In a further variation on this embodiment, the system aligns the identified fan speeds with the target fan speed by using a feedback and control loop, which adjusts corresponding control voltages for the identified fan speeds to align with the target fan speed.

In a further variation, the target fan speed and associated harmonics are not proximate to a structural resonant frequency of the computer system.

In a variation on this embodiment, the spectral analysis is performed using a Fast Fourier Transform (FFT).

In a variation on this embodiment, the vibration transducer is either physically attached to the inside of the computer system or the outside of the computer system.

Table 1 illustrates fan speeds inferred by an accelerometer, compared against fan speeds obtained by a laboratory standard strobe tachometer in accordance with embodiments of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Computer System with a Multiple Fan Speeds Sensing Mechanism

Figure 1:
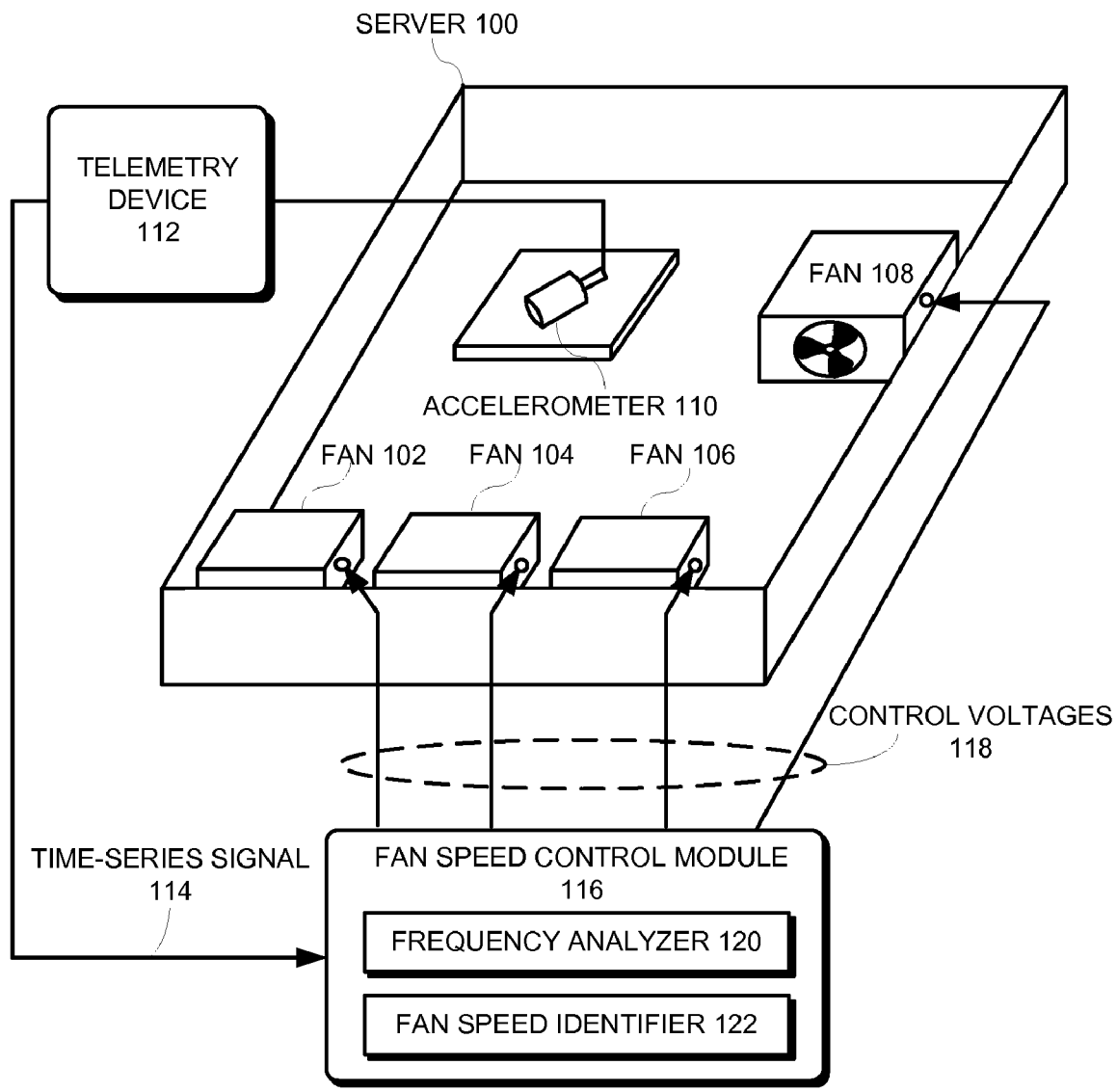
FIG. 1 illustrates a server that includes multiple fans in accordance with an embodiment of the present invention.

FIG. 1 illustrates a server 100 that includes multiple fans in accordance with an embodiment of the present invention. More specifically, server 100 includes a number of cooling fans, i.e., fan 102, fan 104, fan 106, and fan 108. These cooling fans are deployed to increase air circulation around heat-generating components in server 100 and to pump heat out of the server 100. Such heat-generating components can include: the CPU, memory modules, the power supply, and hard disk drives (HDDs). Hence, fans 102-108 may be placed at different locations inside server 100. Note that although server 100 is used for the purposes of illustration, embodiments of the present invention can be applied to other computer systems, such as desktop computers, workstations, storage arrays, embedded computer systems, automated manufacturing systems, and other computer systems which use one or more cooling fans for system cooling.

As cooling fans become increasingly more powerful, they can create a significant amount of mechanical vibrations in the computer system during operation. In the following discussion, we use terms "vibration" and "mechanical vibration" interchangeably. We also use the term "fan speed" to refer to the fan's rotation frequency. Note that because fan blades rotate at a constant rotational speed in terms of rotations per minute (RPM), this RPM value gives rise to a corresponding frequency component in the associated vibration spectrum (in Hz). For example, a fan speed of 6000 RPM creates a mechanical vibration containing a frequency component of (6000 RPM)/(60 sec)=100 Hz. Consequently, embodiments of the present invention can infer a fan speed from a frequency in the vibrational spectrum. Note that other frequency components can exist in the vibrational spectrum which are associated with the fan operation. These frequency components can include, but are not limited to, harmonics (e.g., 1×, 2×, 3×, 4×, etc.) of the primary frequency, and beat frequencies created by slightly different speeds.

Referring back to FIG. 1, in one embodiment of the present invention, fans 102-108 are designed to operate at a target fan speed. However, an actual mean fan speed of each fan in server 100 is typically not exactly equal to the target fan speed if a control mechanism is not provided. Note that previous techniques use multiple tachometer RPM sensors to measure fan speeds of multiple fans in the server, wherein each RPM sensor is physically coupled to an associated fan.

Server 100 also includes an accelerometer 110, which measures the mechanical vibrations in server 100. Specifically, accelerometer 110 picks up vibration signals associated with fans 102-108, which contain information on the associated fan speeds. Accelerometer 110 then produces an electric signal that replicates the vibration signals. Note that accelerometer 110 can be placed at different locations inside server 100. For example, accelerometer 110 can be attached to the chassis and support structures of server 100, to a chip package in server 100, or to the casing of a system module, such as an HDD. In a further embodiment, accelerometer 110 can be attached to the outside cover of server 100.

In one embodiment of the present invention, accelerometer 110 can be a dedicated accelerometer to measure vibrations and infer speeds for fans 102-108. In another embodiment of the present invention, accelerometer 110 is an embedded accelerometer within an HDD of server 100. Note that some HDDs include one or more accelerometers which are integrated inside the disk drives. In this embodiment, no additional accelerometers need to be deployed in server 100. Note that other types of vibration transducers can be used in place of accelerometer 110. Moreover, although server 100 is illustrated with one accelerometer 110, in some embodiments of the present invention, multiple accelerometers are deployed and placed at different locations within server 100 to measure vibrations.

The output of accelerometer 110 is coupled to a telemetry device 112, which is capable of gathering electrical signals produced by accelerometer 110 and generating a time-series signal 114. Telemetry device 112 directs time-series signal 114 to a local or a remote location that contains fan speed control module 116. In one embodiment of the present invention, telemetry device 112 is a Continuous System Telemetry Harness (CSTH).

Fan speed control module 116 performs multiple functions. In one aspect, fan speed control module 116 infers fan speeds from time-series signal 114. In another aspect, fan speed control module 116 provides feedback and control functions, which adjust fan speeds of fans 102-108 to align them with a target fan speed. In this later aspect, fan speed control module 116 comprises a voltage control mechanism that generates control voltages 118 to directly set individual fan speeds.

As seen in FIG. 1, the multiple functions of fan speed control module 116 are represented by sub-modules. In one embodiment of the present invention, fan speed control module 116 includes a frequency analyzer 120, which performs a spectral analysis on time-series signal 114 to obtain a frequency domain data for the collected vibration signals. Note that this frequency domain data contains frequency peaks that are associated with fan speeds for individual fans 102-108 in server 100. Also note that these frequency peaks can include both primary (fundamental) frequencies and the associated harmonics. In one embodiment of the present invention, the spectral analysis is performed using a Discrete Fourier Transform (DFT), wherein the DFT is computed using the Fast Fourier Transform (FFT) technique.

Fan speed control module 116 also includes a fan speed identifier 122, which is used to map frequency peaks to individual fans in the server. Note that fan speed control module 116 can also include a monitoring module that monitors the set of fans to determine if any of the fan speeds, an associated harmonic, or a beat frequency intersects with an internal structural resonance of server 100. If such a condition is found, fan speed control module 116 can use a reporting module to identify the specific fan that triggers this condition. Note that both the monitoring module and the reporting module are not explicitly illustrated in FIG. 1.

We describe the overall fan speed control operation in more detail below.

Monitoring and Controlling the Fan Speeds

Figure 2:
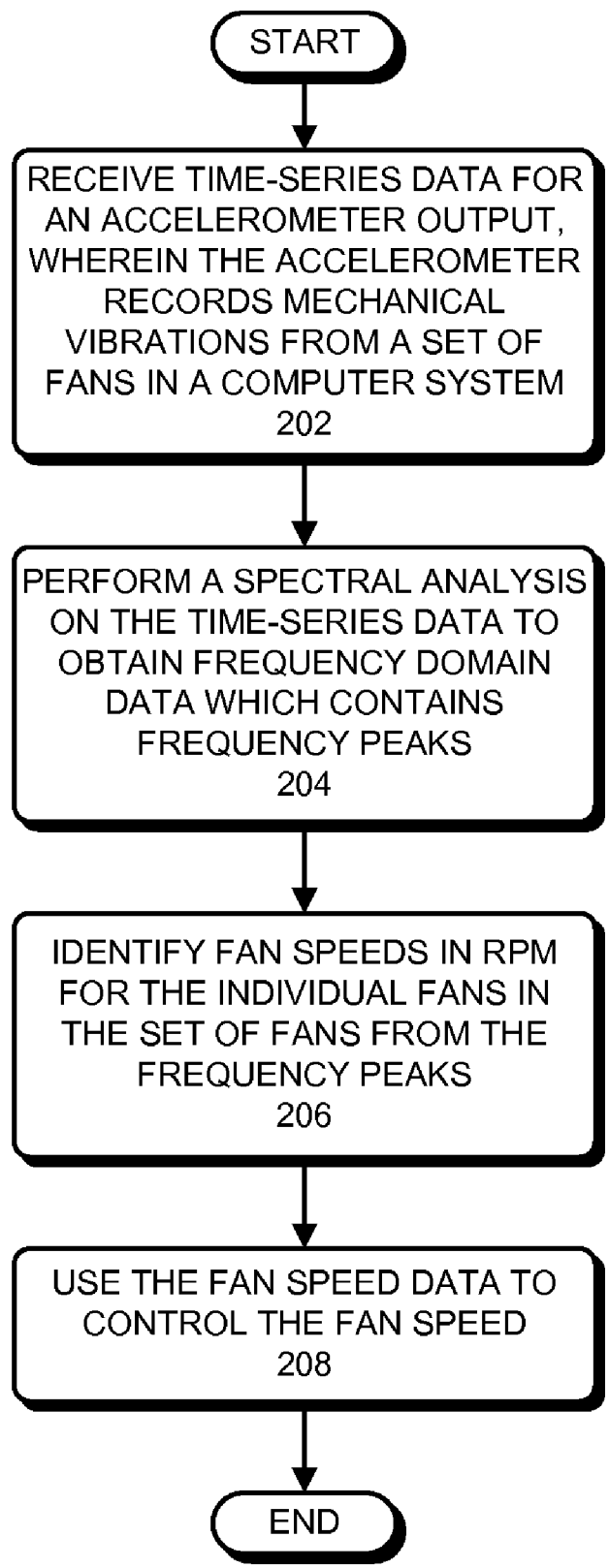
FIG. 2 presents a flowchart illustrating the process of monitoring and controlling fan speeds for a set of fans in a computer system in accordance with an embodiment of the present invention.

FIG. 2 presents a flowchart illustrating the process of monitoring and controlling fan speeds for a set of fans in a computer system in accordance with an embodiment of the present invention.

During operation, the system receives time-series data for an accelerometer output, wherein the accelerometer records mechanical vibrations from the set of fans in the computer system (step 202). In one embodiment of the present invention, this time-series data is sampled from an analog output of the accelerometer using the CSTH.

Next, the system performs a spectral analysis, such as an FFT, on the time-series data to obtain frequency domain data (step 204). Note that this frequency domain data contains all the frequency peaks associated with fan speeds for individual fans in the set of fans. However, this frequency domain data does not indicate the associations between a particular frequency peak and a particular fan.

The system next identifies fan speeds (in RPM) for the individual fans in the set of fans from the frequency peaks (step 206). In one embodiment of the present invention, the system uses a sequential margining technique that "bumps" each fan speed and then observes changes in the spectrum. We describe this margining technique in more detail below in conjunction with FIG. 3. After step 206, the system determines a precise fan speed for each fan in the computer system.

The system then uses the fan speed data to control the fan speeds (step 208). Specifically, the system feeds the fan speed data and a target fan speed into a feedback and control loop, which uses the difference between actual and target speeds to actively adjust the fan speed to align with the target fan speed. Referring back to FIG. 1, note that this feedback and control loop can include accelerometer 110 for measuring fan speed data, telemetry device 112 for collecting and delivering fan speed data, and fan speed control module 116 which analyzes fan speed data, identifies individual fan speeds, and converges fan speeds to the target fan speed by adjusting control voltages 118.

In one embodiment of the present invention, the target fan speed is selected such that the target fan speed and its harmonics are not proximate to any of the structural resonant frequencies of the computer system. Such structural resonant frequencies can include structural resonant frequencies for the whole system, such as chassis and support structures, and for individual system modules, for example the HDDs. Note that the system can also use the fan speed data to monitor and report situations where a particular fan speed or the associated harmonics are proximate to a structural resonant frequency.

Note that in addition to aligning the fan speeds with the target fan speed for avoidance of internal structural vibration resonances, the above-described vibration-enabled inferential fan-speed sensing technique can be used for other control functions involving the fan speeds. For example, these control functions may be designed to control system thermal objectives.

Identifying the Fan Speeds from Corresponding Frequency Peaks

Figure 3:
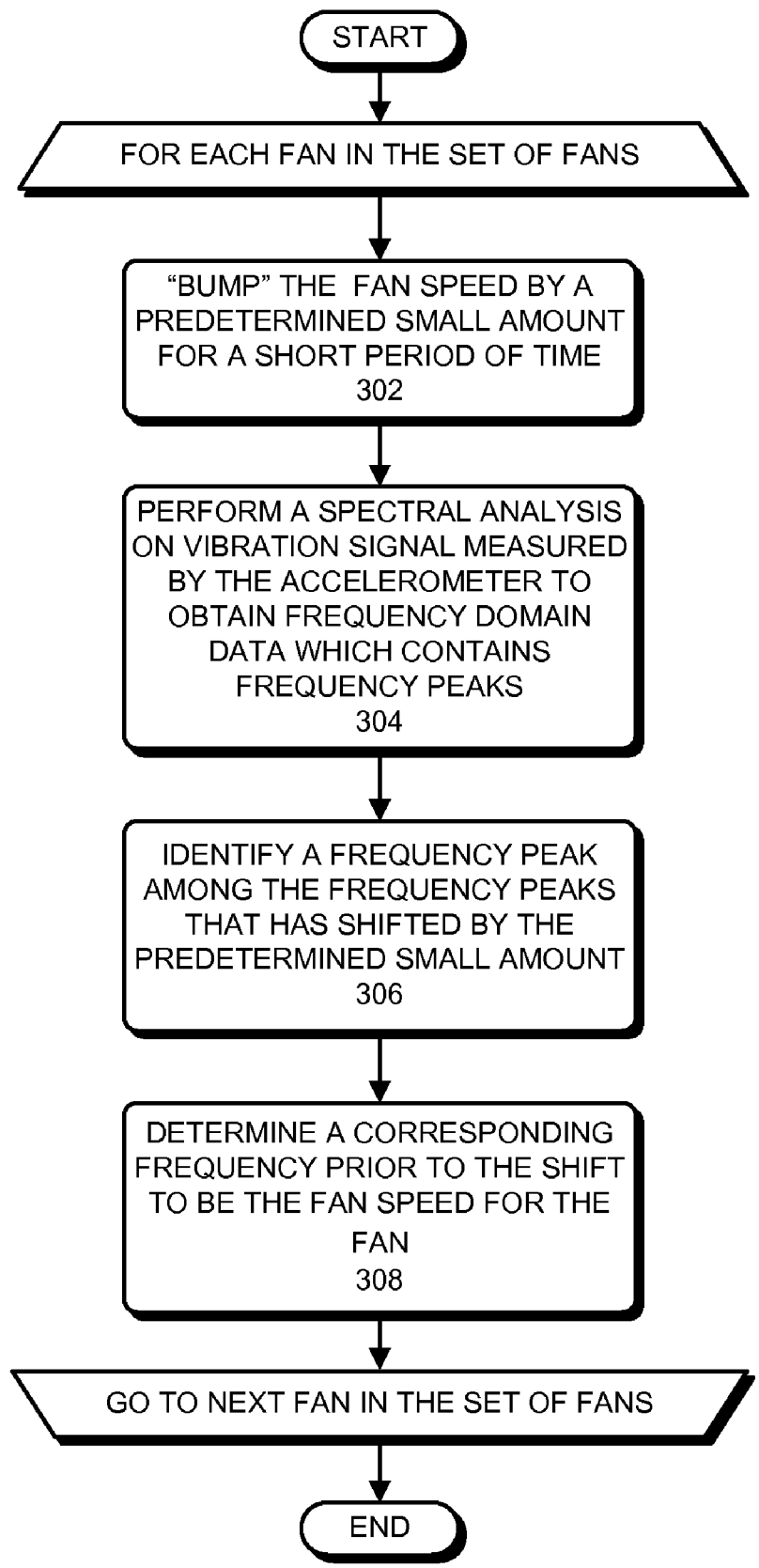
FIG. 3 presents a flowchart illustrating the process of identifying fan speeds from corresponding frequency peaks in the frequency domain data in accordance with an embodiment of the present invention.

FIG. 3 presents a flowchart illustrating the process of identifying fan speeds from corresponding frequency peaks in the frequency domain data in accordance with an embodiment of the present invention.

During operation, the system chooses a fan from the set of fans and then "bumps" the corresponding fan speed by a predetermined small amount for a short time period (step 302). In one embodiment of the present invention, the system bumps the fan speed by margining up a corresponding fan speed control voltage for the short time period, for example for less than 10 seconds. This causes the fan speed to increase by a predetermined small amount, for example by 5% of the current fan speed during this brief time period. The system subsequently restores the original control voltage for the fan. In another embodiment of the present invention, the system bumps the fan speed by margining down the corresponding fan speed control voltage for the short time period. This causes the fan speed to decrease by a predetermined small amount before the system restores the original control voltage for the fan.

Next, the system performs a spectral analysis, such as an FFT, on the vibration signal measured by the accelerometer during this short time period to obtain frequency domain data (step 304). Note that this frequency domain data contains all the frequency peaks associated with fan speeds for individual fans in the set of fans. The system then identifies a specific frequency peak among all the frequency peaks that has shifted by that small amount (step 306). Specifically, if the fan speed is margined up, the corresponding frequency peak shifts to a higher frequency. On the other hand, if the fan speed is margined down, the corresponding frequency peak shifts to a lower frequency. The system next identifies a corresponding frequency prior to the shift as the fan speed for the fan (step 308).

In one embodiment of the present invention, to increase the reliability with which the system identifies frequency peaks, the system repeats steps 302-306 while alternately margining up and margining down the fan speed. For example, the system first performs steps 302-306 while margining up fan speed by 5%, and identifies a peak that shifts upward by 5%. Next, the system repeats steps 302-306 while margining down fan speed by 5%, and identifies a peak that shifts downward by 5%. If both peak shifts correspond to the same frequency peak, the system determines the fan speed based on the shifted peak.

Note that the system cycles through the set of fans and repeats steps 302-306. This allows the system to map the set of frequency peaks in the frequency domain data to the set of fans in the computer system.

EXAMPLES

Figure 4A:
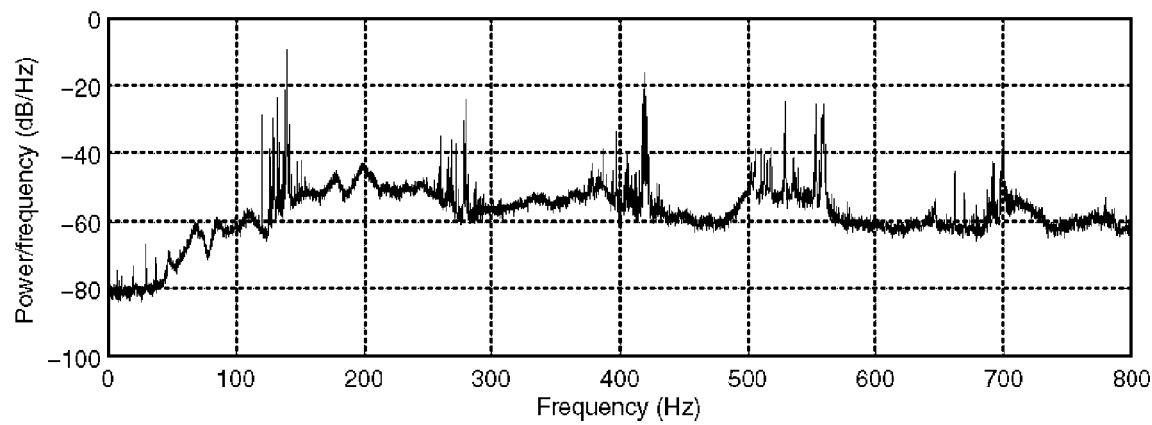
FIG. 4A illustrates a frequency domain power spectrum of mechanical vibrations of a server measured by an accelerometer in accordance with embodiments of the present invention.

FIG. 4A illustrates a frequency domain power spectrum for mechanical vibrations of a server as measured by an accelerometer in accordance with embodiments of the present invention. Specifically, the time-domain signal associated with frequency-domain spectrum of FIG. 4A was obtained by attaching an accelerometer to the outside cover of a server and by using an accelerometer to collect vibration information.

Note that the power spectrum in FIG. 4A has a frequency range from 0 to 800 Hz and includes five clusters of frequency peaks. These five clusters of power spectrum density (PSD) peaks correspond to the primary frequencies and the associated harmonics of 2×, 3×, 4×, and 5× of the primary frequencies.

Figure 4B:
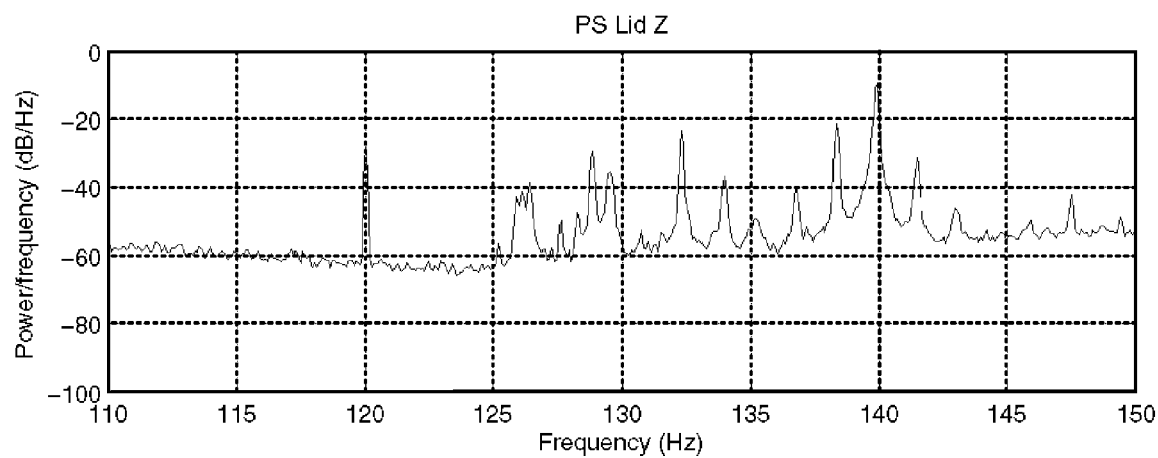
FIG. 4B illustrates a zoomed-in view of the primary frequency region of the power spectrum in FIG. 4A in accordance with embodiments of the present invention.

FIG. 4B illustrates a zoomed-in view of the primary frequency region of the power spectrum in FIG. 4A in accordance with embodiments of the present invention. As seen in FIG. 4B, the power spectrum comprises a sharp PSD spike at 120 Hz which corresponds to a hard disk rotation frequency at 7200 RPM. The first peak is followed by a range of frequency peaks from 126 Hz up to 143 Hz, which correspond to a set of fan speeds of all the fans in the server. Note that these fan speeds are distributed across a wide range rather than coinciding at a common speed. Also note that the vertical axis (PSD) in the power spectrum is displayed on a logarithmic scale, which indicates the high signal-to-noise ratio of these frequency peaks. Even sharper spectra can be obtained for a system configured with an accelerometer that is rigidly affixed to an internal structural component.

Note that the resolution of these PSD peaks demonstrates a high resolution of ~1 Hz. This is a significant improvement over fan speeds measured by tachometer sensors which typically have much lower resolutions and are highly quantized.

To demonstrate the extremely high accuracy of the proposed technique, Table 1 illustrates fan speeds inferred by an accelerometer, compared against fan speeds obtained by a laboratory standard strobe tachometer in accordance with embodiments of the present invention. Note that the average uncertainty of the accelerometer technique is less than 0.1%.

CONCLUSION

Embodiments of the present invention provide a fan-speed sensing technique that uses a single accelerometer associated with a computer system to accurately resolve and infer individual fan speeds for fans in the computer system. The obtained fan speeds have much higher accuracy than fan speeds obtained with conventional commercial off-the-shelf (COTS) fan speed sensors. The present invention also enables multi-fan computer systems to be built with COTS fans without shaft speed sensors, thereby simplifying instrumentation and signaling complexity. Furthermore, the present invention facilitates aligning fan speeds for multi-fan computer systems, thereby eliminating the "beat" effect caused by fan speed spread. This technique also facilitates accurate fan speed control for the applications such as optimal thermal provisioning and for avoidance of internal structural vibrational resonances.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

TABLE 1

Strobe Tachometer and Accelerometer Measurements (in RPM)

| | | Strobe Tachometer | Accelerometer |
|---|---|---|---|
| P1 PS (DS1500-3L-001) | Fan 1 | 7356 | 7356 |
| | Fan 2 | 7503 | 7500 |
| P2 PS (DS1500-3-001) | Fan 1 | 6541 | 6546 |
| | Fan 2 | 6788 | 6784 |

What is claimed is:

1. A method for determining fan speeds for a set of fans in a computer system, comprising:
   receiving time-series data collected by a vibration transducer associated with the computer system, wherein the vibration transducer is configured to record mechanical vibrations from the set of fans;
   performing a spectral analysis on the time-series data to obtain frequency peaks associated with fan speeds for individual fans in the set of fans; and
   identifying fan speeds for the individual fans in the set of fans from the frequency peaks.

2. The method of claim 1, wherein for each fan in the set of fans, identifying the fan speed involves:
   perturbing the speed of the fan by a small amount;
   observing a shifted peak in the frequency peaks in response to the perturbation; and
   identifying a corresponding frequency at the shifted peak to be the speed of the fan.

3. The method of claim 2, wherein perturbing the speed of the fan involves one of the following:
   margining up the fan speed for a short period of time;
   margining down the fan speed for a short period of time; or
   a combination of the above.

4. The method of claim 3, wherein margining the fan speed involves adjusting a control voltage for the fan speed.

5. The method of claim 1, wherein the vibration transducer is an accelerometer.

6. The method of claim 5, wherein the accelerometer can include:
   a dedicated accelerometer; or
   an embedded accelerometer in a hard disk drive of the computer system.

7. The method of claim 1, wherein the method further comprises aligning the identified fan speeds with a target fan speed.

8. The method of claim 7, wherein aligning the identified fan speeds with the target fan speed involves using a feedback and control loop, which adjusts corresponding control voltages for the identified fan speeds to align with the target fan speed.

9. The method of claim 7, wherein the target fan speed and associated harmonics are not proximate to a structural resonant frequency of the computer system.

10. The method of claim 1, wherein the spectral analysis is performed using a Fast Fourier Transform (FFT).

11. The method of claim 1, wherein the vibration transducer is either physically attached to the inside of the computer system or the outside of the computer system.

12. A computer-readable storage medium storing instructions that when executed by a computer cause the computer to perform a method for determining fan speeds for a set of fans in a computer system, comprising:
   receiving time-series data collected by a vibration transducer associated with the computer system, wherein the vibration transducer is configured to record mechanical vibrations from the set of fans;
   performing a spectral analysis on the time-series data to obtain frequency peaks associated with fan speeds for individual fans in the set of fans; and
   identifying fan speeds for the individual fans in the set of fans from the frequency peaks.

13. The computer-readable storage medium of claim 12, wherein for each fan in the set of fans, identifying the fan speed involves:

perturbing the speed of the fan by a small amount;

observing a shifted peak in the frequency peaks in response to the perturbation; and identifying a corresponding frequency at the shifted peak to be the speed of the fan.

14. The computer-readable storage medium of claim 13, wherein perturbing the speed of the fan involves one of the following:

margining up the fan speed for a short period of time;

margining down the fan speed for a short period of time; or a combination of the above.

15. The computer-readable storage medium of claim 14, wherein margining the fan speed involves adjusting a control voltage for the fan speed.

16. The computer-readable storage medium of claim 12, wherein the method further comprises aligning the identified fan speeds with a target fan speed.

17. The computer-readable storage medium of claim 16, wherein aligning the identified fan speeds with the target fan speed involves using a feedback and control loop, which adjusts corresponding control voltages for the identified fan speeds to align with the target fan speed.

18. The computer-readable storage medium of claim 16, wherein the target fan speed and associated harmonics are not proximate to a structural resonant frequency of the computer system.

19. The computer-readable storage medium of claim 12, wherein the spectral analysis is performed using a Fast Fourier Transform (FFT).

20. An apparatus that determines fan speeds for a set of fans in a computer system, comprising:

a vibration transducer associated with the computer system, wherein the vibration transducer is configured to record mechanical vibrations from the set of fans;

a receiving mechanism configured to receive time-series data collected by the vibration transducer;

a computing mechanism configured to perform a spectral analysis on the time-series data to obtain frequency peaks associated with fan speeds for individual fans in the set of fans; and an identification mechanism configured to identify fan speeds for the individual fans in the set of fans from the frequency peaks.

21. The apparatus of claim 20, wherein for each fan in the set of fans, the identification mechanism is configured to:

perturb the speed of the fan by a small amount;

observe a shifted peak in the frequency peaks in response to the perturbation; and identify a corresponding frequency at the shifted peak to be the speed of the fan.

22. The apparatus of claim 20, wherein the vibration transducer is an accelerometer.

23. The apparatus of claim 22, wherein the accelerometer can include:

a dedicated accelerometer; or an embedded accelerometer in a hard disk drive of the computer system.

24. The apparatus of claim 20, further comprising an alignment mechanism configured to align the identified fan speeds with a target fan speed.

25. The apparatus of claim 24, wherein the alignment mechanism is configured to use a feedback and control loop to align the identified fan speeds with a target fan speed.

26. The apparatus of claim 20, wherein the vibration transducer is either physically attached to the inside of the computer system or the outside of the computer system.

* * * * *